United States Patent [19]

Frank et al.

[11] Patent Number: 4,700,484
[45] Date of Patent: Oct. 20, 1987

[54] DIAMETER MEASURING DEVICE

[75] Inventors: Jimmy I. Frank, Pearland; John R. Wolfe, III, Pasadena, both of Tex.

[73] Assignee: Gagemaker, Inc., Houston, Tex.

[21] Appl. No.: 886,514

[22] Filed: Jul. 16, 1986

[51] Int. Cl.⁴ .......................... G01B 3/12; G01B 7/28
[52] U.S. Cl. .................................. 33/142; 33/141 E; 33/178 E
[58] Field of Search .................. 33/142, 141 R, 141 E, 33/141 D, 141 S, 141 B, 141 C, 141 F, 178 R, 178 E

[56] References Cited

U.S. PATENT DOCUMENTS

| | | |
|---|---|---|
| 3,172,208 | 3/1965 | Lowy ..................................... 33/142 |
| 3,307,265 | 3/1967 | Jenks et al. . |
| 3,378,929 | 4/1968 | Deardorff et al. . |
| 3,561,120 | 2/1971 | Culver . |
| 3,561,121 | 2/1971 | Culver . |
| 3,656,239 | 4/1972 | Hutchinson et al. ............. 33/141 R |
| 3,740,856 | 6/1973 | Culver . |
| 3,941,178 | 3/1976 | Simpson et al. ...................... 33/142 |
| 4,524,524 | 6/1985 | Frank et al. . |

FOREIGN PATENT DOCUMENTS 2052066 1/1981 United Kingdom .................. 33/142

157871 3/1964 U.S.S.R. ............................. 33/141 E

OTHER PUBLICATIONS

NASA Tech Brief, Measuring Perimeters of Large Round Objects, vol. 9, No. 3, Fall 1985, MFS-28046.

*Primary Examiner*—William D. Martin, Jr.
*Attorney, Agent, or Firm*—Pravel, Gambrell, Hewitt, Kimball & Krieger

[57] ABSTRACT

An apparatus for measuring the diameter of an object is disclosed. A rotatable wheel of known diameter capable of movement in three axes is contacted with an object capable of rotation. The wheel is attached to a shaft encoder which produces pulses as the wheel rotates. As the object is rotated, start and end reference marks are sensed and the pulses produced by the shaft encoder are counted. A microprocessor calculates the diameter of the object knowing the wheel diameter and counts per revolution and the counts per revolution of the object. The apparatus can be adapted to measure the internal or external diameter of smooth objects or the internal or external pitch diameter of threaded objects. The apparatus can also use a calibrated object to measure the diameter of a wheel of unknown diameter to allow the wheel to be used in later measurements.

14 Claims, 12 Drawing Figures

MAIN PROGRAM

RECALL CALIBRATION

FIG. 9

CHANGE DIRECTION

FIG. 10

CHANGE UNIT

FIG. 11

READY

FIG. 12

DIAMETER MEASURING DEVICE

FIELD OF THE INVENTION

The invention relates to measuring instrumentation, especially instrumentation designed to measure diameters of objects.

DESCRIPTION OF THE KNOWN ART

Measuring the diameters of various smooth and threaded objects is necessary to determine that the objects conform sufficiently closely to any required specifications. The objects to be measured can vary from relatively small diameters such as one half inch to very large diameters measuring in numbers of feet. Accuracy of the measurement is very important in measuring certain parameters of straight or tapered threads, specifically the pitch diameter, so that flawed sections of pipes or threads do not create problems when used. It is desirable to determine any potential flaws in the threads or deviations from specification of the diameters of the objects during a preshipment or on receipt inspection and not when the object is actually being supplied for use in the field.

There are several ways to measure the diameter of smooth and threaded objects. The internal or external diameter of a smooth object of relatively small size was measured using a standard micrometer technique, with internal or external micrometers as necessary. These measurements were performed a large number of times on different portions of the object to ensure proper adherence to specifications.

U.S. Pat. No. 3,740,856 indicated that common friction wheel measuring devices have been used in diameter measuring systems, but gave no further information regarding the design or technique of using such a system and did not indicate the accuracy which such a system could attain.

An alternate technique for measuring the perimeter of a large round object was disclosed in a NASA Tech Brief, Measuring Perimeters of Large Round Objects, Vol. 9, No. 3, Fall 1985, MFS-28046. The reference disclosed using a wheel in contact with the perimeter section of an object, with the wheel shaft being connected to an optical encoder which was used to convert the rotation of two electrical pulses. These pulses were sensed by a computer to determine the circumference of the object. This system required the use of an optical encoder mounted on a turntable shaft used to rotate the object to allow referencing of the object's position. Numerous factors combined to make this system unacceptable. Additionally, this was a rather complicated system and required specific structural adaptations over and above the relatively simple systems and the various lathe or rotational systems which are presently available in machine shops.

Several different parameters of threads are necessary to determine and evaluate the accuracy and tolerances of the threads. One of the key parameters is pitch diameter, which is defined as the diameter of the pitch cylinder, which in turn is defined as a cylinder having a diameter and location of its axis such that its surface would pass through a straight thread in such a manner as to make the widths of the thread ridge and thread groove equal. The pitch diameter is, therefore, located equidistantly between the sharp major and minor cylinders of a given thread form. The measured pitch diameter of a thread can vary due to changes in thread pitch, thread lead, helical path deviation, flank angle deviation and other thread parameters. Equivalent parameters and measurements are also used and necessary in tapered threads.

Pitch diameters of various straight threads and the corresponding tapers of tapered threads were generally measured in one of two ways. The first way was a functional measurement using various rings and plugs for external and internal threads, respectively. The rings and plugs were considered to be ideal masters and if they could properly thread onto the object under test, the object under test was deemed to be functionally accurate. There were a number of problems with using ring and plug gages in determining and inspecting threads because there are a number of thread defects, including a varying pitch diameter, which are not accurately inspected by a functional gage. Additionally, a different ring or plug gage was required for each different size and type of thread which was tested. This lead to having a large number of gages available at an extreme expense, resulting in a very high cost for a complete set of gages. The cost of the ring and plug gages increases as the diameter to be measured increases and generally ring and plug gages are not used on the larger pipe sizes because of the cost and complexity of manufacturing the gage itself.

The other common technique for measuring pitch diameter was elemental analysis, which could be done several different ways. One method was to lay a wire or other accurate device into the thread groove so that the wire contacted the thread at the pitch diameter and extended an amount outwardly. This outward dimension was measured using a standard micrometer and the pitch diameter was calculated based on the measured diameter and the known wire thickness. This technique was slow and required an accurate placement of the wires and the micrometer and therefore was very difficult and very expensive to use for a complete analysis of the pitch diameter of the entire threaded portion of the object.

An alternative method was generally used on larger pipe sizes and involved the use of a $\pi$ tape. A $\pi$ tape was essentially a tape measure which was placed around the circumference of the object and was calibrated in the diameter of the object. This method was limited in its accuracy because of placement of the tape and various other physical constraints.

Therefore it can be seen that there was a need for a highly accurate pitch diameter measuring device which accurately and rapidly allowed the pitch diameter to be measured at a large number of positions along the thread and could be used on a wide range of sizes of pipe varying from small pipes to very large pipes, both internally and externally. Additionally, there was a need for a device which could accurately measure the diameter of smooth surfaces.

SUMMARY OF THE INVENTION

The present invention provides a system capable of measuring the diameter of any continuously indexable surface, with the indexable surface diameter of the object ranging from relatively small levels to very large values and yet retaining very high accuracy while performing the measurement.

A continuously indexable surface is defined as a surface on which a point can be established and on which that point moves about an axis. The device uses a wheel having a very accurately known or determined diameter connected to a shaft encoder and brought into contact with the surface of the object whose diameter is to be measured. The object is located on a lathe or other rotatable machine so that the object can rotate to allow the wheel to track the circumference of the object. The wheel is rotatably mounted in a wheel housing which is slidably attached to an attachment frame. The attachment frame is affixed to a fixed surface with respect to the object, so that no relative motion between the frame and the object occur. The wheel is spring loaded into the object to provide an accurate frictional force to limit slippage and other possible deformation problems of the wheel.

The wheel is aligned perpendicular to the rotational axis of the object and can move in both the axial and radial directions. The axial direction is defined as that direction along the axis of the object or the axis of rotation of the wheel, the radial direction is perpendicular to the axial direction and the third axis or reference is an angle of rotation from a given starting location. Because the wheel can move in these three axes, it can be used to measure tapered threads as an example. The wheel surface can have a beveled edge designed to exactly match a given ideal thread such that the contact of the wheel with the thread form is made at the ideal pitch diameter location.

Attached to an appropriate portion of the machine or the object is a reflective element with a photoelectric source and detector to transmit and receive light from this reflective element when the reflective element is properly aligned. The reflective element need only rotate at the same rate as the object and need not be affixed to the object or the lathe spindle. When the reflective section is rotated and passes the photodetector, the reflected light beam is sensed by the detector and the leading edge is used to determine a zero reference point for the rotation of the object. This zero reference signal and the shaft encoder signal are connected to a microprocessor which then uses the known wheel diameter, the known number of counts used to produce one rotation of the wheel, the number of rotations completed of the object, and the number counts received from the shaft encoder performing one or two revolutions to determine the diameter of the object. The diameter is determined using a simple proportion of the diameter of the wheel, the wheel count, and the measured count.

The system can be calibrated in two different fashions. A preset wheel diameter can be entered into the machine with the number of counts for a single revolution of this preset wheel diameter being known or calculable. This allows the system to quickly and easily convert between different wheel diameters to allow different accuracies or different pitch diameter wheels to be used as necessary.

The second method of determining the wheel diameter is by placing a wheel of unknown diameter on the system and measuring an object of precisely known diameter, thereby allowing the system to calculate the wheel diameter knowing the counts of the measured object, the measured object diameter and the counts determined while performing the revolution of the object. In this way, nonstandard wheels can be used as necessary.

A measurement cycle is started on command from the operator and is automatically performed as the object rotates. The resulting measured diameter value is then displayed by the system for interpretation and analysis by the operator.

DETAIL DESCRIPTION OF THE PREFERRED EMBODIMENT

Figures 1, 2:
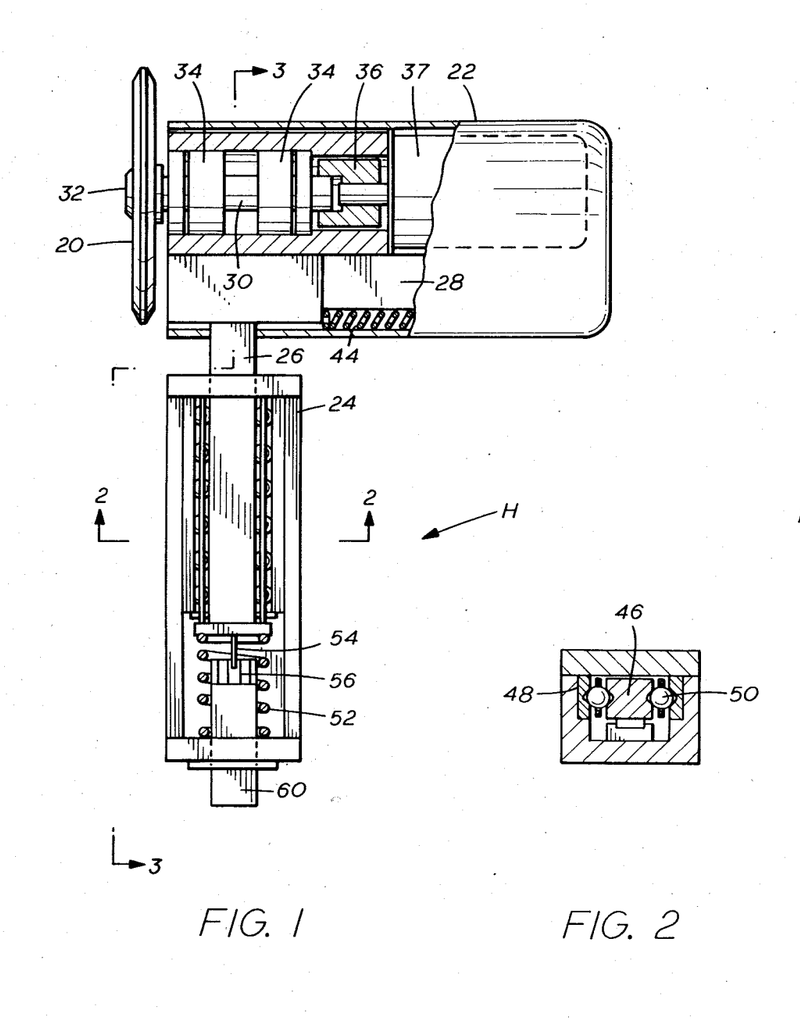
FIG. 1 is a side view in partial cross-section showing the mechanical assembly of the wheel, wheel housing and attachment frame of a system according to the present invention.
FIG. 2 is a cross-sectional view along the line 2—2.

In FIG. 1, the wheel 20 is shown in reference to the head assembly H, which assembly contains the electromechanical components of a diameter measuring system. The head assembly H is rigidly mounted to a fixed location (not shown). The lathe or other means of rotation of the object whose diameter is to be measured is also fixed with respect to the head assembly H. It is to be noted that the head assembly H need not be mounted to the lathe but just need be in a fixed relationship with the lathe.

The head assembly contains a wheel housing 22, an attachment frame 24, a radial guide 26 and an axial guide 28. The axial guide 28 is aligned parallel to the rotational axis of the object and the radial guide 26 is preferably mounted perpendicular to and intersecting the axis of the object. This arrangement allows the wheel 20 to travel axially and radially as needed. The attachment frame 24 is the portion of the head assembly H which is mounted to the fixed location, allowing the wheel 20 to move in all three axes when used with straight or tapered threads.

The wheel 20 is affixed to a shaft 30 by means of a nut 32. The shaft 30 is held rigid with respect to the wheel housing 22 by means of bearings 34. The shaft 30 is connected to a shaft encoder 37 by means of a flex coupling 36. For highest accuracy, the concentricity of the wheel 20 and the shaft encoder 37 on the shaft 30 is critical or sinusoidal diameter measuring patterns will result. The shaft encoder 37 is preferably a high resolution shaft encoder producing a very high number of pulses per revolution to allow sufficient accuracy when used in combination with a properly sized wheel 20 to meet the desired accuracy for the system.

Figure 3:
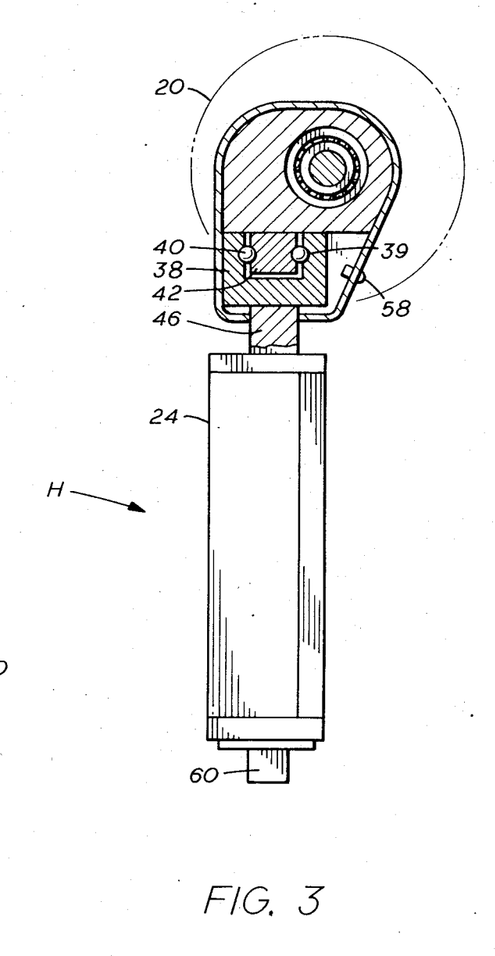
FIG. 3 is an end view in partial cross-section of the assembly of FIG. 1.

The axial guide 28 is shown in more detail in FIG. 3. The axial guide 28 includes a channel 38 containing a slot with grooves 39 on the sides so that bearings 40 can coact with an axial slide shaft 42 and allow free axial movement of the wheel housing 22. A spring 44 is used to bias the wheel housing 22 to a desired position and spring load the wheel 20 against any thread on the surface of the object to limit slippage and other possible tracking errors.

The attachment frame 24 contains the items comprising the radial guide 26, namely a slide rail 48, a main shaft 46 and bearings 50, thereby allowing the wheel 20 to freely move in a radial direction. The main shaft 46 is biased in an upwardly or outwardly direction from the attachment frame 24 by means of a spring 52. The spring 52 is used to load the wheel 20 into the object to be measured with sufficient force so that the wheel has a good frictional grip on the object. This required force is measured by means of a pin 54 extending from the main shaft 46 and contacting a properly positioned switch 56, so that the switch 56 is in a closed position when the spring 52 is sufficiently compressed to properly force the wheel 20 into contact with the object. This proper loading condition is indicated by a light 58 being activated, creating a simple feedback path for the operator. The attachment frame 24 also contains an electrical connector 60 which provides a simple connection for the various electrical conductors located in the head assembly H.

The system can be used to measure both internal and external diameters. If an internal diameter is to be measured, the appropriately sized wheel 20 is mounted. The wheel 20 is positioned and loaded to contact the interior surface of the object and the diameter measurement is taken. A similar technique is used for performing external measurement, except that the wheel 20 is positioned and loaded to contact the exterior surface of the object.

If pitch diameter of a thread is to be measured, the perimeter of the wheel 20 can be appropriately beveled and sized as shown in FIG. 1 so as to match a perfect thread form and thereby allow an accurate measurement of the pitch diameter of the thread under test.

The system can measure the diameter of any object having a continuously indexable surface. A continuously indexable surface is one on which a point can be established and on which that point moves about an axis. This surface will form a circle in the case of a round cylindrical object, an oval in the case of an elliptical object and on irregular shapes will form a continuous path without a beginning or an end. On a threaded surface, this indexable surface will include the helical path formed by the threads starting at one point along the thread and ending up an axial distance later after having revolved the object 360° or more.

Figure 4:
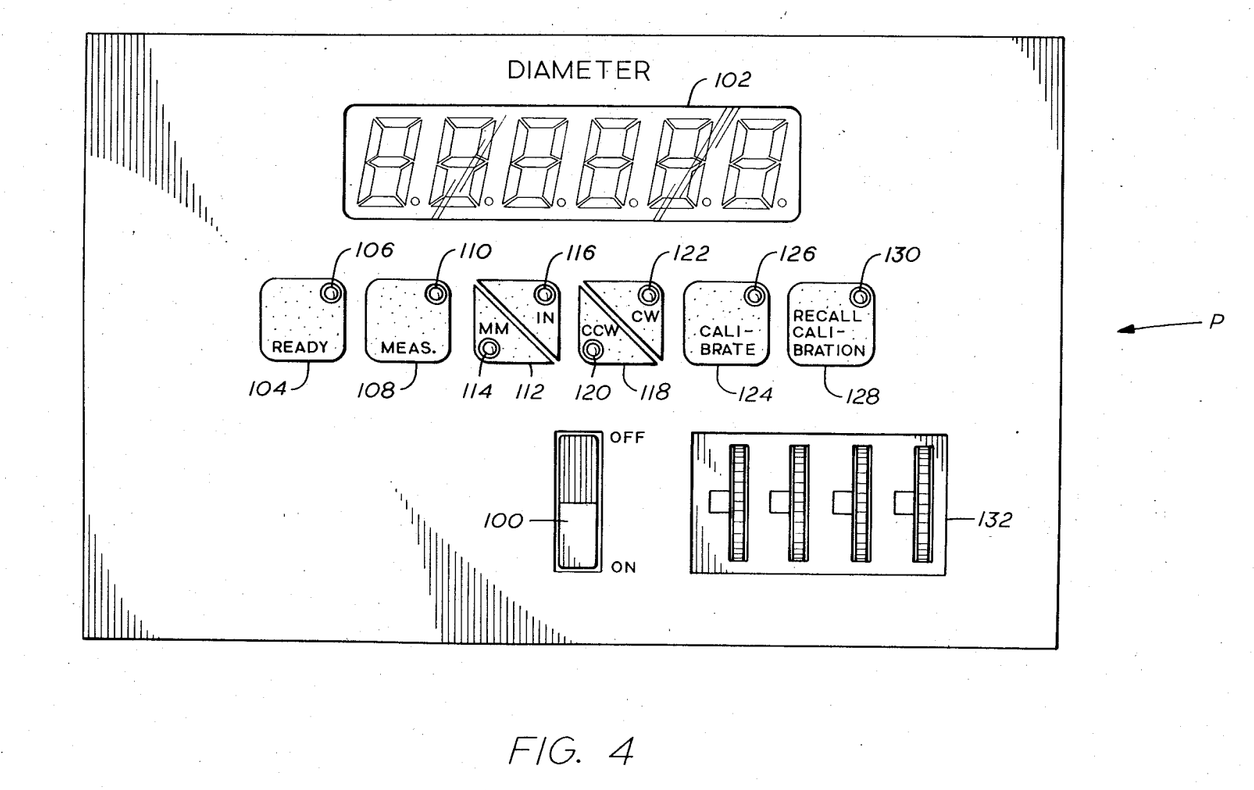
FIG. 4 is a front view of an enclosure of portions of a system according to the present invention.

A front panel P of the system is shown in FIG. 4 and shows the various switches and displays utilized in the system. A power switch 100 which is a two position switch, is used to activate or deactivate the system as desired. A diameter display 102 which is a series of light emitting diode displays, has the required number of digits and decimal points to accurately and sufficiently display the measured diameter of the object.

There is a series of command switches on the front panel P with various feedback lights to indicate the status of the switches. A ready switch 104 and its corresponding ready light 106 are used to clear the diameter display 102 if desired and to indicate that the system is operation. The ready light 106 is illuminated whenever the device is ready for a command by the operator.

A measurement switch 108 is used to initiate the measuring of an object's diameter by the system. When the measurement switch 108 is activated, the system automatically begins its measurement sequence and the measured diameter is displayed in the diameter display 102. A measurement light 110 is illuminated when the system is performing a measurement and is extinguished when the system is not performing a measurement sequence.

A unit switch 112 is used to toggle the system status between a measurement in the English system based on inches and a metric system millimeter measurement. The current unit status of the system is displayed by the illumination of either a millimeter light 114 or an inch light 116.

A directional switch 118 is used by the operator to indicate to the system the direction of rotation of the object. This is necessary because the shaft encoder 37 produces different outputs depending upon its rotational direction. A counterclockwise light 120 and a clockwise light 122 indicate the current directional status of the system.

A calibrate switch 124 is used to initiate a calibration sequence and a calibrate light 124 is illuminated during the operation of this sequence. The calibration sequence will be explained in greater detail during the discussion of the operation and the control sequences of the system.

A recall calibration switch 128 is used to recall a previously stored calibration value from the memory of the system and a recall light 130 is illuminated during the recall or retrieval of the calibration value.

It can be seen that the various status lights on the switches are used to provide both a feedback to the user that the button or switch has been depressed and to indicate the operating status of the system.

A series of thumbwheel switches 132 is used to provide input information from the operator to the system and the use of the thumbwheel switches 132 will be explained in greater detail during the detailed description of the calibration sequence.

A central processing unit or microprocessor 200 (FIG. 5) is the computational and control element used in the system for system control, input data interpretation and data output. The system is generally connected to a source of line supply voltage 202, with this line voltage being filtered by a filter 204, transformed by a transformer 206 to the appropriate and desired voltage for use by a power supply 208, which in turn supplies electrical power to the various electronic and electro-mechanical portions of the system.

Figure 5:
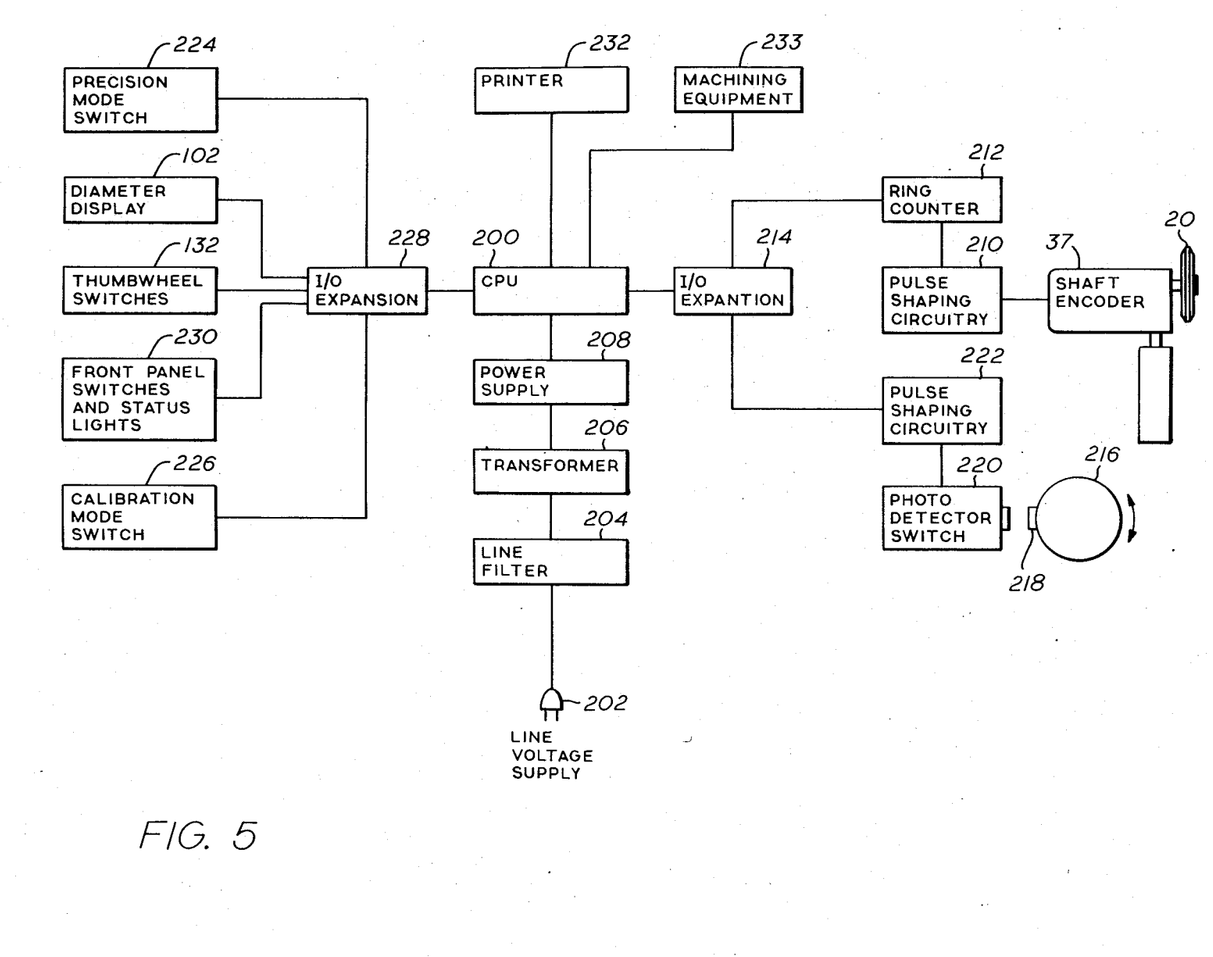
FIG. 5 is a schematic electrical circuit diagram of a system according to the present invention.

The wheel 20 is mechanically connected to shaft encoder 37. As the wheel 20 rotates, the shaft encoder 37 emits pulses indicating that the wheel 20 has travelled a given angular direction. These pulses emitted by the shaft encoder 37 are received by pulse shaping circuitry 210 and modified and filtered appropriately to provide a clean input signal to a ring counter 212. The ring counter 212 is used to count the number of pulses produced by the shaft encoder 37 and therefore represents a measurement of the angular displacement of the wheel 20. The ring counter 212 contains the required number of bits to handle the various allowable combinations of wheel diameter, object diameter and shaft encoder resolution. The ring counter 212 is interfaced to the microprocessor 200 by means of input/output expansion circuitry 214 which allows the microprocessor 200 to read the ring counter 212 and to clear the ring counter 212 as needed. The ring counter 212 can be cleared by the microprocessor 200 as required to allow initiation of a new counting sequence and can be read to help determine the diameter of an object.

A zero reference point is necessary in the system to provide a basis for the angular rotation measurement of the object and this is accomplished by using a reflective element 218 mounted to a rotating portion of the object or lathe 216. This reflecting portion need only be mounted to a portion of the machine or object which is rotating at the same rate as the object to allow the microprocessor 200 to sense the beginning or reference point of a revolution of the object.

This reference location is detected by using a photodetector switch 220 which transmits a light beam at the rotating object 216 at all times. When the reflecting element 218 passes by the light beam emitted by the photodetector 220, the light beam is reflected to a detector located in the photodetector switch 220. The photodetector switch 220 senses this transition from no reflection to reflection. This is an indication of the reference point. The photodetector switch 220 is configured to operate as a leading edge sensor. It is preferable that a single element photodetector unit be used to limit the amount of calibration required when setting up the reflective system, but separate photoemitters and photodetectors can be used as needed. The pulse obtained when the photodetector switch 220 senses the reflective element 218 is transmitted to pulse shaping circuitry 222 which appropriately shapes the wave form for interpretation by the microprocessor 200 via the input/output expansion unit 214. In this way the microprocessor 200 can sense the leading edge or zero reference point of the object, and clear the ring counter 212 to begin a one or two revolution counting sequence. The system could use other methods of determining a zero reference, which are well known to those skilled in the art.

The measured diameter is displayed in the diameter display 102 by having the microprocessor 200 access the diameter display 102 via input/output expansion circuitry 228. The input/output expansion circuitry 228 is also used to allow the microprocessor 200 to interrogate the front panel switches 230 and the thumbwheel switches 132.

There are two additional switches not shown on the front panel P which are used in the operation of the system. The first switch is a precision mode switch 224. The precision mode switch 224 is used to instruct the microprocessor 200 to perform the diameter calculation based on one or two revolutions of the object. The use of a two revolution count is preferable in smaller diameter objects and is used to remove the effects of certain fixed count errors which may occur due to half count positioning of the shaft encoder 37 and other matters relating to the starting and ending of a counting sequence. Because of the larger number of counts which are obtained in a large diameter measurement, it is satisfactory that the precision mode switch 224 be in the one revolution position for reading larger diameter objects with their higher relative count and therefore lower relative error results.

The second switch is a calibration mode switch 226 and is used in combination with the front panel calibration switch 124 to indicate the manner of calibration, be it by entry of a known wheel size or by measurement of a wheel size using a known diameter object These techniques will be explained in more detail in the calibration operation sequence.

A printer 232 is attached to the microprocessor 200 to allow optional printing of the diameter display as desired. In this way a written record of the diameter of the object can be retained for future use.

The microprocessor 200 can also communicate the measured diameter to other machining equipment 233 for offsetting and other uses.

The microprocessor 200 operates on a stored series of control instructions in the form of a computer program, the steps of which are shown schematically in FIGS. 6—12.

Figure 6:
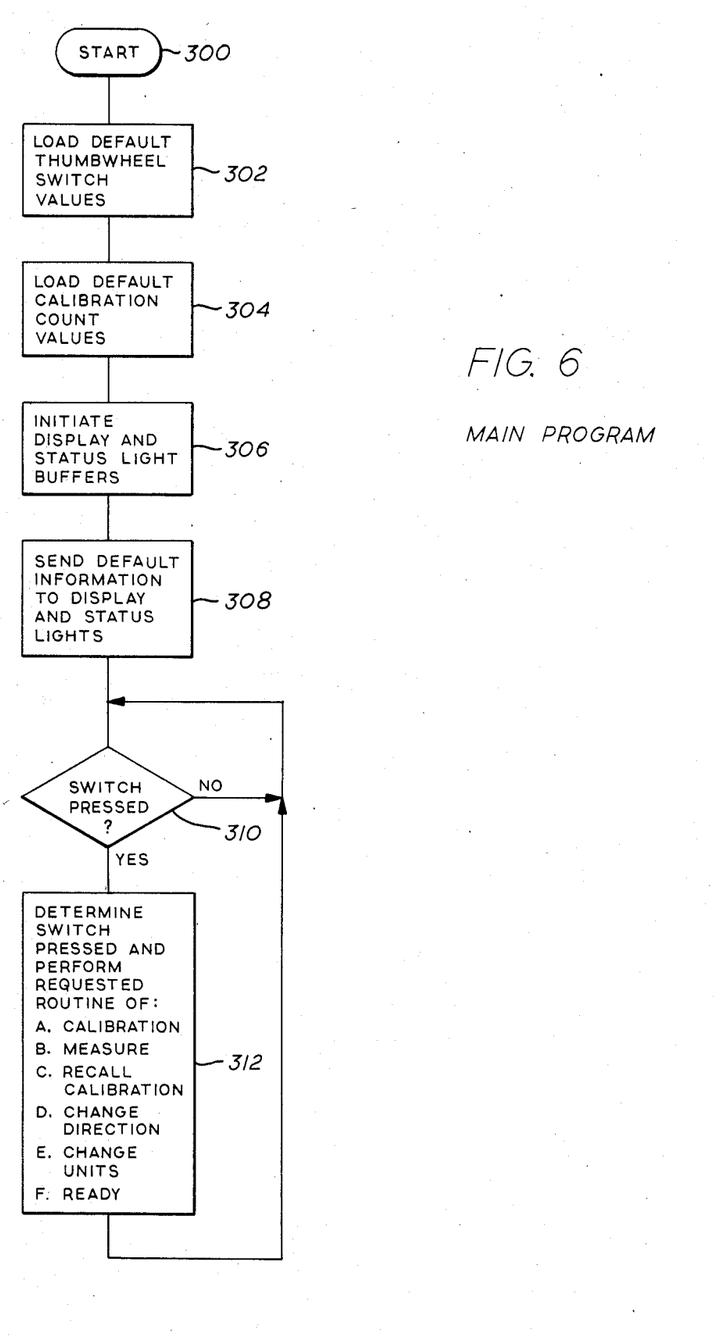
FIGS. 6–12 are flow chart illustrations of the program sequences of a system according to the present invention.

When the system is first activated, the main program sequence 300 is initiated. In step 302 the microprocessor 200 loads a default thumbwheel switch value into the appropriate thumbwheel switch locations contained in the memory of the microprocessor 200. This default value is the factory installed default of the original wheel that is supplied with the unit upon manufacture. In step 304 the microprocessor 200 loads the default calibration count corresponding to the count value of the default wheel 20 into the calibration count location in the microprocessor's memory. In step 306 the microprocessor 200 initiates the diameter display 102 and status light buffers and this default information is sent from the buffers to the appropriate display in step 308. Upon power-up or initialization the diameter display 102 displays all zeros and the ready light 106, inches light 116 and clockwise light 122 are activated, with the system being set to that status.

After completing this initialization sequence, the microprocessor 210 evaluates whether one of the front panel switches has been activated or pressed in step 310. If no switch was pressed, control is returned to step 310 because the system is initialized and is waiting for an operator command to perform. If a switch was pressed during the evaluation of step 310, control is transferred to step 312 where the microprocessor 200 determines which switch was pressed and performs the requested routine as indicated by the switch. There are six requestable routines consisting of (1) the calibration sequence 320, where the wheel characteristics are changed or determined; (2) the measurement sequence 400, where the measurement is performed; (3) the recall calibration sequence 460, where a previously stored calibration value is retrieved; (4) the change direction sequence 480, where the direction of rotation of the unit is changed; (5) the change unit sequence 490, where the system is transferred to the other of millimeters or inches; and (6) the ready sequence 500, which is used to clear the display. After completing the sequence requested in step 312, control returns to step 310 and the unit continues in this loop until power is shut off or a switch is depressed.

Figure 7:
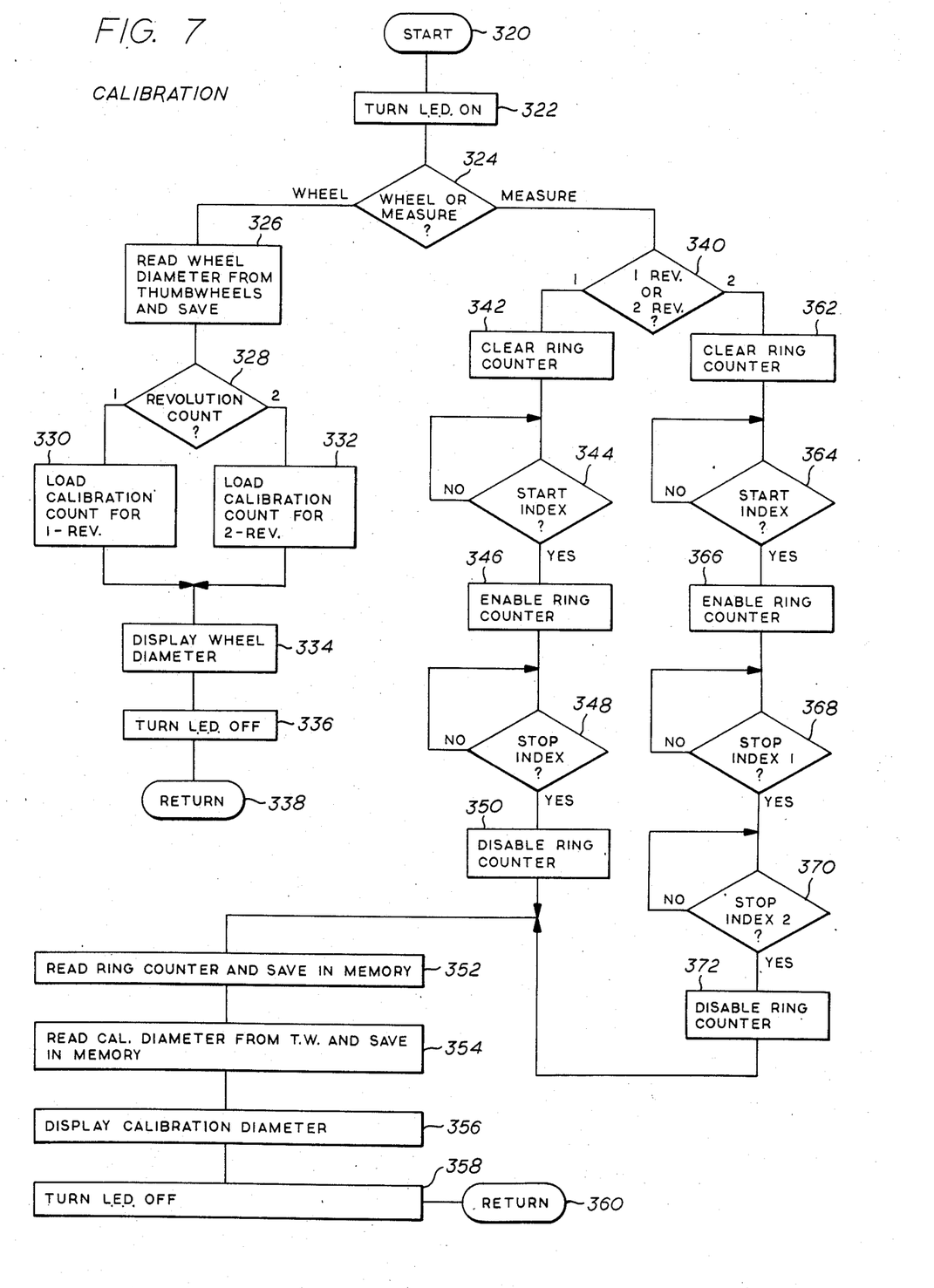

The calibration logic sequence 320 is commenced at step 322 by turning on the calibration status light 126 to indicate that the system is in calibration mode. The next step is step 324 where the microprocessor 200 interrogates the calibration mode switch 226 to determine if the switch 226 is in the wheel or measurement position. Calibration of the device can be performed by entering a predefined wheel value using the thumbwheels or can be done by measuring a known diameter object and calculating the diameter of the wheel. The calibration mode switch 226 indicates which of these methods is desired. If the microprocessor 200 determined that the wheel method was desired in step 324, control is transferred to step 326 where the wheel diameter is read from the thumbwheel switches 132 and stored in the microprocessor 200 memory.

In step 328 the microprocessor 200 interrogates the status of the precision mode switch 224 to determine if the measurements are to be made using a one or two revolution count. As previously indicated, the two revolution count is used for smaller diameter measurements to increase the precision by reducing the effective result of any starting and stopping errors. If the precision mode switch 224 is in the one revolution position, step 328 transfers control to step 330 where the microprocessor 200 loads the proper calibration count for a one revolution measurement of the wheel diameter indicated by the thumbwheel switches 132. If the precision mode switch 224 had been in the two revolution position, step 332 loads the calibration count for a two revolution rotation of the selected wheel.

Both steps 330 and 332 transfer control to step 334 where the selected wheel diameter is displayed in the diameter display 102 to indicate that the wheel diameter has been interpreted by the microprocessor 200 and the proper counts have been loaded. After displaying the wheel diameter, step 334 transfers control to step 336 which turns off the calibration status light 126 to indicate that the calibration mode is finished and control is transferred to step 338 which returns control to step 310 for further interrogation of the front panel command switches.

If the microprocessor 200 determined that the wheel measurement technique had been requested in step 324, control transfers to step 340 where the precision mode switch 224 is interrogated to determine one revolution or two revolution selection. If the one revolution position is selected, control is transferred to step 342 where the microprocessor 200 clears the ring counter 212 in preparation for counting a unknown diameter. In step 344 the microprocessor 200 then interrogates whether the start index or zero reference as determined by the photodetector switch 220 has passed the photodetector switch 220. If not, the microprocessor 200 loops on this step waiting for the start index to appear to indicate the start of a measurement cycle. When the start index does appear, step 344 transfers control to step 346 where the microprocessor 200 enables the ring counter 212, which then begins receiving pulses from the shaft encoder 37 and counting up.

After enabling the ring counter 212, control is transferred to step 348 where the microprocessor 200 waits for the index mark or zero reference to be sensed again, indicating the end of a single revolution. After receiving the signal that the index has rotated past the photodetector switch 220, the microprocessor proceeds to step 350 where it disables the ring counter 212 and stops counting pulses from the shaft encoder 37. The ring counter 212 at this point contains the counts of the unknown diameter, in this case the unknown wheel diameter, for use in calculations to determine the wheel diameter. Step 352 is then executed in which the microprocessor 200 reads the ring counter value and stores this value for later calculation. In step 354 the microprocessor 200 reads the diameter of the calibrated object from the thumbwheel switches 132 and saves this value to memory. After reading these values from the thumbwheel switches 132, the microprocessor 200 executes step 356 where it performs the calibration proportion to determine the diameter of the unknown wheel, which is saved in the calibration memory for later recall and the calibrated object diameter is then displayed in the diameter display 102. After displaying the calculated wheel diameter in step 356, the microprocessor 200 proceeds to step 358 where the calibration status light 126 is turned off and control proceeds to step 360 which returns control to step 312 for further command activation.

If the microprocessor 200 determined in step 340 that the precision mode switch 224 was in the two revolution state or position, control is transferred to step 362 where the ring counter 212 is cleared. After clearing the ring counter 212, control is transferred to step 364 where the microprocessor 200 waits for the start index mark to be received. After receiving the index mark, step 366 is performed in which the microprocessor 200 enables the ring counter 212 which begins counting shaft encoder pulses. In step 368 the microprocessor 200 waits for a first index pulse to be received. After receiving a first index pulse, which indicates that a single revolution has been completed, control is transferred to step 370 where the microprocessor 200 waits for the second index pulse to be received to indicate completion of a second revolution. After receiving this second index pulse in step 370, the microprocessor 200 disables the ring counter 212 in step 372 and control is transferred to step 352 for further calculations and diameter display.

Figure 8:
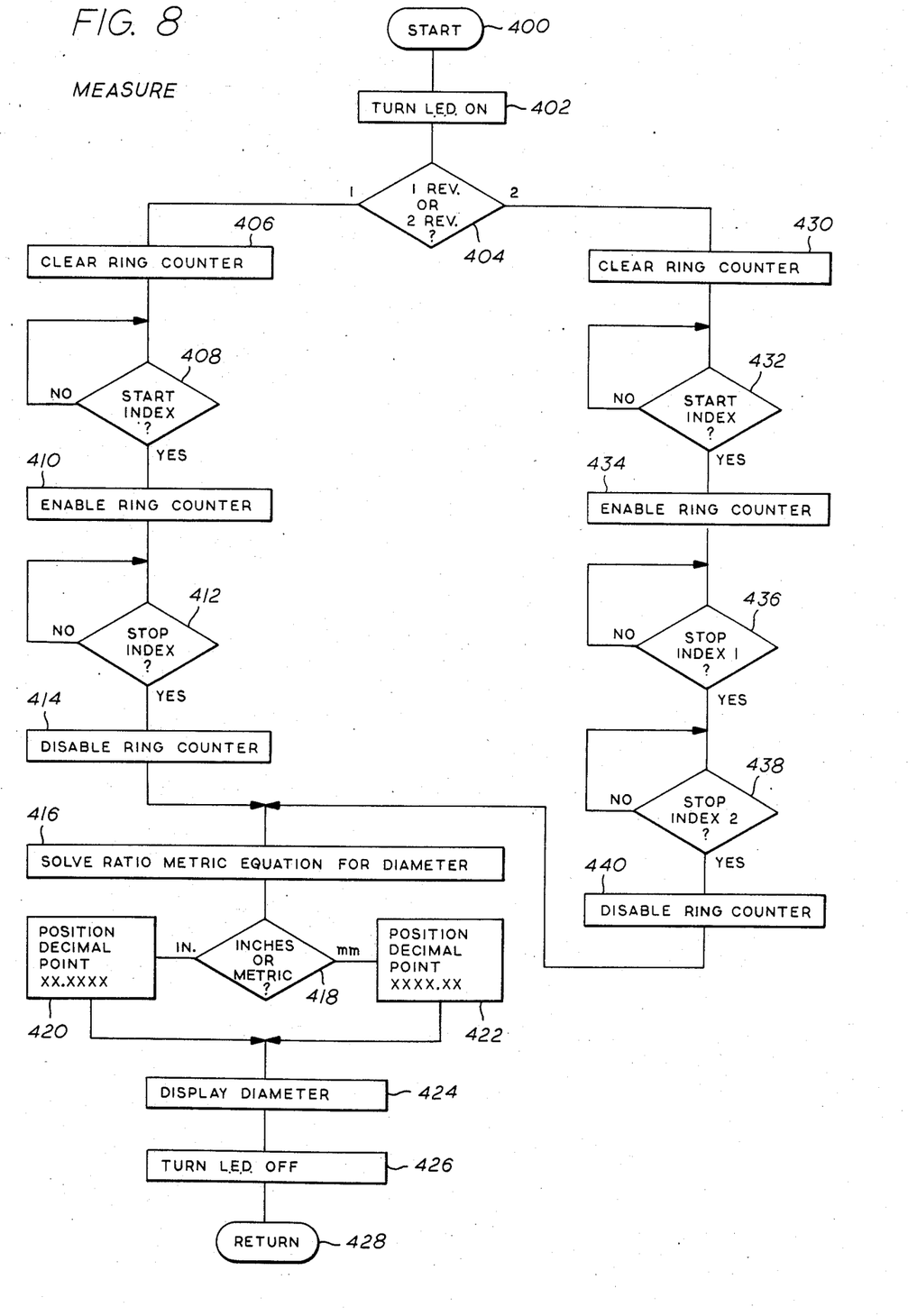

If the operator had requested that the system measure an object diameter or thread pitch diameter by depressing the measurement switch 108, control is transferred to the measure logic sequence 400 which commences by activating the measurement status light 110 in step 402. The next step is step 404 where the microprocessor 200 determines the position of the precision mode switch 224. If the precision mode switch 224 is in the one revolution position, control is transferred to step 406 where the microprocessor 200 clears the ring counter 212 to initialize the ring counter 212 for a measurement sequence. The microprocessor 200 then waits for the index mark to pass the photodetector switch 220 in step 408. When the index mark passes the photodetector switch 220 to indicate the start of a measurement cycle, the microprocessor 200 performs step 410 where it enables the ring counter 212. After enabling the ring counter 212 in step 410, the microprocessor 200 waits for the stop index mark to be received in step 412. After receiving the index mark signal from the photodetector switch 220 to indicate the completion of the single revolution, the microprocessor 200 performs step 414 where it disables the ring counter 212. At this point the ring counter 212 contains the count of the object being measured.

Control is then transferred to step 416 where the microprocessor 200 performs the ratiometric equation to determine diameter. The ratiometric equation is defined as known wheel diameter divided by known wheel count is equal to unknown object diameter divided measured object count. The microprocessor 200 knows the wheel diameter and the related count for the given wheel diameter and has just measured the count for the object. The microprocessor 200 therefore has only one variable to determine and thus can determine the diameter of the object.

After solving the equation in step 416, control is transferred to step 418 where the microprocessor 200 determines if the proper display is inches or millimeters. If the display is an inches display, control is transferred to step 420 where the appropriate conversion is made and the decimal point is appropriately placed. If it was a metric or millimeter display, control is transferred from step 418 to 422 for the appropriate conversion to the proper units and proper location of the decimal point. After either steps 420 or 422 the determined object diameter is displayed in the diameter display 102. After completion of the display step 424, control proceeds to step 426 where the measurement status light 110 is turned off and proceeds to step 428 which returns sequence control to step 310 for further switch commands processing.

If the microprocessor 200 in step 404 determines that the precision mode switch 224 is in the two revolution position, control is transferred to step 430 where the ring counter 212 is again cleared and the microprocessor 200 then waits for the starting index mark in step 432. After receiving the starting index mark in step 432, the microprocessor 200 enables the ring counter 212 in step 434 and waits for the first revolution index mark in step 436. After receiving this first revolution index mark the microprocessor 200 proceeds to step 438 where the microprocessor 200 waits for the second revolution index mark to appear. After the microprocessor 200 receives an indication from the photodetector switch 220 that the second revolution has been completed, control is transferred to step 440 where the ring counter 212 is disabled, at which time control is transferred to step 416 and following where the ratiometric equation is solved and the appropriate measured diameter is displayed.

It is to be noted that only one measurement occurs each time the measurement switch 108 is depressed even though the object may be rotating continuously. To get a second measurement, the operator must again hit the measurement switch 108 after the previous measurement has been completed.

Figure 9:
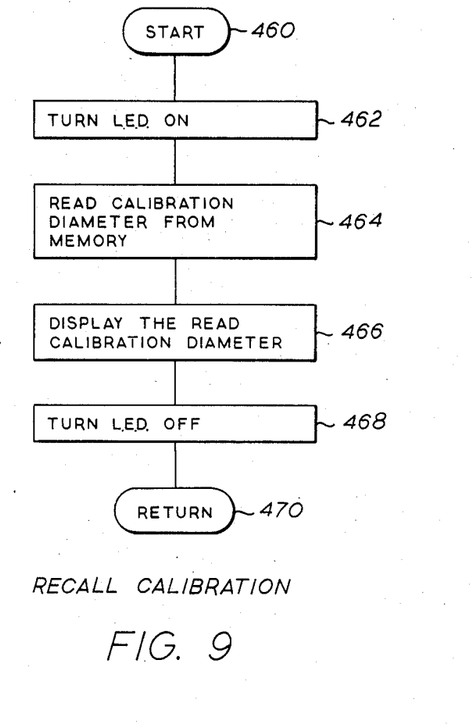

If the operator had depressed the recall calibration switch 128 in step 310, step 312 transfers control to the recall calibration sequence 460. This sequence commences by having the microprocessor 200 turn on the recall calibration status light 130 to indicate that a stored calibration is being retrieved. Step 464 then retrieves the calibration diameter and counts from the memory of the microprocessor 200 in step 464, and displays the diameter in step 466. After displaying the calibration diameter in step 466, control is transferred to control 468 where the calibration light 130 is deactivated and control is transferred to step 470 for a return to step 310 for further command execution.

Figure 10:
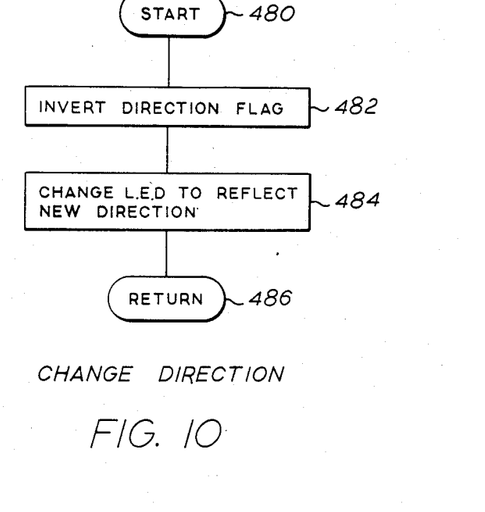

If in step 312 the microprocessor 200 determined that the change direction switch 118 had been depressed by the operator, control transfers to the change direction sequence 480 which commences with step 482. Step 482 changes the direction flag located in the microprocessor 200 to indicate that the object is rotating in the direction opposite the previous direction. Because the default direction on power-up is a clockwise rotation, pressing the change direction switch 118 a first time would cause the direction flag to be switched to the counterclockwise indication. After changing the flag in step 482, the microprocessor 200 performs step 484 where the appropriate status light to indicate the new direction is activated and the previously activated status light is deactivated. Step 486 returns control to step 310 for further command processing.

Figure 11:
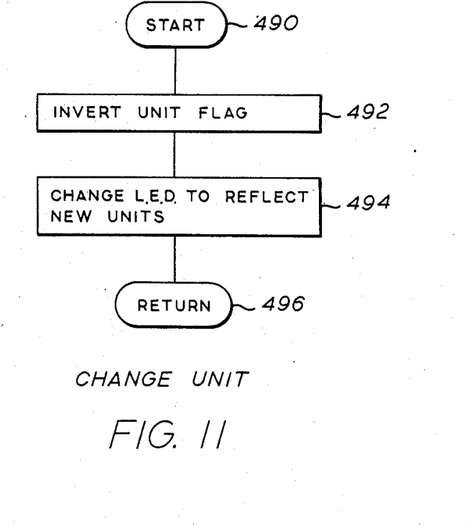

If it was determined in step 312 that the change units switch 112 had been depressed by the operator, control is transferred to the change units sequence 490 which commences with step 492. The microprocessor 200 changes its internal units flag to indicate a change in the displayed or required units from inches to millimeters or millimeters to inches as appropriate. In step 494 the microprocessor 200 sets the appropriate status indication light and deactivates the previous status indication light so that the status of the two indication lights in the units indicates the present units status of the system. After properly changing the lights in step 494, control is transferred to step 496 which returns control to step 310 for further command processing.

Figure 12:
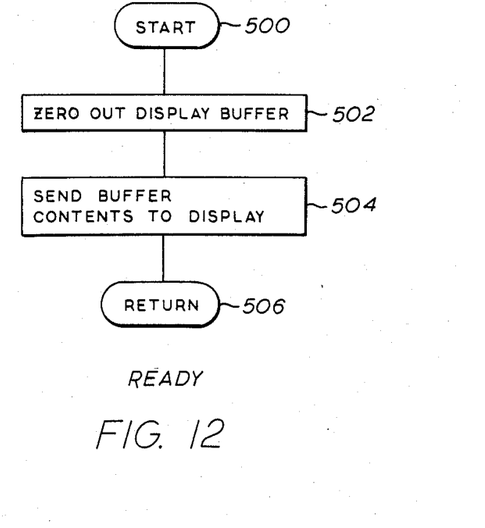

The other available front panel switch is the ready switch 104 and if this switch has been depressed by operator, step 312 passes control of the microprocessor 200 to the ready sequence 500 which commences by clearing or zeroing the diameter display buffer in step 502. The zero valued buffer contents are then transmitted to the diameter display 102 in step 504 to indicate a cleared or zero diameter. Unless the ready switch 104 is activated after initialization of the system, the diameter display 102 retains the value of the previous measurement or value displayed until a new value is determined and displayed. After zeroing the displayed diameter by transmitting the buffered contents in step 504, control is transferred to step 506 which returns control to step 310 for further command processing.

As can be seen from the above description, the diameter measuring system is very easy to use and yet provides a very accurate measuring of a varied range of diameters ranging from external diameters of one half inch or internal diameters of one half inch up to diameters measuring in the tens of feet. The system is very flexible and can measure both straight and tapered thread parameters including pitch diameter repeatedly and quickly, allowing better testing and evaluation of materials and objects.

The foregoing disclosure and description of the invention are illustrative and explanatory thereof, at various changes the size, shape and materials, as well as in the details of the illustrated construction and logic flow may be made without departing from the spirit of the invention.

We claim:

1. An apparatus for measuring the diameter of an object having a continuously indexable surface, the object being located with respect to a fixed surface and rotatable about an axis, comprising:
   fixture means attached to the fixed surface;
   wheel means of known diameter rotatably attached to said fixture means, the rotational axis of said wheel means being substantially parallel to the rotational axis of the object to be measured;
   said wheel means being adapted to contact the surface of the object to be measured and be movable in a direction parallel to the object rotational axis during object diameter measurement;
   encoder means attached to said wheel means for producing a signal indicative of rotation of said wheel means;
   start and end means for determining at least one revolution of the object about its rotational axis and for producing signals indicative of the start and end of a revolution and indicative of the number of revolutions completed;
   means responsive to said encoder means and said start and end means for determining the rotational travel of said wheel means between the start and end of at least one revolution of the object and producing a signal indicative thereof;
   means for calculating the diameter of the object responsive to said rotational travel determination means, said start and end means, and the diameter of said wheel means and for producing a signal indicative thereof; and
   means responsive to said calculation means for displaying the calculated diameter of the object.

2. The apparatus of claim 1, wherein said wheel means is further adapted to be movable in a direction perpendicular to the object rotational axis.

3. The apparatus of claim 1, wherein said wheel means is adapted to be movable in a direction parallel to the object rotational axis.

4. The apparatus of claim 1, wherein said start and end determination means comprises a reflective material located so as to rotate at the same rate as the object and covering a portion of the rotating surface, a light source directed at the reflective material, and a photodetector for receiving the reflected light.

5. The apparatus of claim 4, wherein said light source and said photodetector are contained in a common housing.

6. The apparatus of claim 1, wherein said encoder means comprises a shaft encoder which produces an electrical pulse signal indicative of rotation of said wheel means.

7. The apparatus of claim 6, wherein said rotational travel determination means comprises a counter for counting the pulses produced by said shaft encoder.

8. The apparatus of claim 1, wherein said wheel means has a perimeter surface comprising a beveled edge for mating with a predetermined thread parameter.

9. The apparatus of claim 1, wherein said determination means is adapted to be responsive to one revolution of the object.

10. The apparatus of claim 1, wherein said determination means is adapted to be responsive to two revolutions of the object.

11. The apparatus of claim 1, further comprising: means for selection of said wheel means known diameter from a plurality of wheel means diameters.

12. The apparatus of claim 1, further comprising:
   means for determining the diameter of a wheel means attached to said fixture means;
   means for storing the determined wheel means diameter; and
   means for using wheel means with the determined wheel means diameter as the wheel means of known diameter.

13. The apparatus of claim 1, wherein said wheel means is adapted for engaging threads located on the object surface.

14. The apparatus of claim 1, wherein said wheel means is biased toward one end of the object.

* * * * *